United States Patent
Dettinger et al.

(10) Patent No.: US 8,180,787 B2
(45) Date of Patent: *May 15, 2012

(54) APPLICATION PORTABILITY AND EXTENSIBILITY THROUGH DATABASE SCHEMA AND QUERY ABSTRACTION

(75) Inventors: Richard Dean Dettinger, Rochester, MN (US); Peter John Johnson, Rochester, MN (US); Richard Joseph Stevens, Mantorville, MN (US); Ikhua Tong, Rochester, MN (US); Eric Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 1130 days.

This patent is subject to a terminal disclaimer.

(21) Appl. No.: 11/226,181

(22) Filed: Sep. 14, 2005

(65) Prior Publication Data

US 2006/0010127 A1    Jan. 12, 2006

Related U.S. Application Data

(63) Continuation of application No. 10/083,075, filed on Feb. 26, 2002, now Pat. No. 6,996,558.

(51) Int. Cl.
*G06F 7/00* (2006.01)
*G06F 17/30* (2006.01)
(52) U.S. Cl. ........................ 707/760; 707/802
(58) Field of Classification Search .............. 707/4, 760, 707/759, 758, 705, 802, 790, 999.004
See application file for complete search history.

(56) References Cited

U.S. PATENT DOCUMENTS

| | | | |
|---|---|---|---|
| 4,611,320 A | 9/1986 | Southard | |
| 4,807,182 A | 2/1989 | Queen | |
| 5,175,814 A | 12/1992 | Anick et al. | |
| 5,201,046 A | 4/1993 | Goldberg et al. | |
| 5,247,611 A | 9/1993 | Norden-Paul et al. | |
| 5,253,362 A | 10/1993 | Nolan et al. | |
| 5,265,246 A | 11/1993 | Li et al. | |
| 5,297,150 A | 3/1994 | Clark | |
| 5,309,359 A | 5/1994 | Katz et al. | |
| 5,345,586 A | 9/1994 | Hamala et al. | |
| 5,369,778 A | 11/1994 | San Soucie et al. | |
| 5,404,506 A | 4/1995 | Fujisawa et al. | |

(Continued)

FOREIGN PATENT DOCUMENTS

JP    2002149697 A    5/2002

(Continued)

OTHER PUBLICATIONS

Llama, "Serach Your Database" Jan. 18, 2002, Codewalkers, p. 1-4.*

(Continued)

*Primary Examiner* — Brent Stace
(74) *Attorney, Agent, or Firm* — Patterson & Sheridan, LLP

(57) ABSTRACT

The present invention generally is directed to a system, method and article of manufacture for accessing data independent of the particular manner in which the data is physically represented. In one embodiment, a data repository abstraction layer provides a logical view of the underlying data repository that is independent of the particular manner of data representation. A query abstraction layer is also provided and is based on the data repository abstraction layer. A runtime component performs translation of an abstract query into a form that can be used against a particular physical data representation.

19 Claims, 5 Drawing Sheets

U.S. PATENT DOCUMENTS

| | | | |
|---|---|---|---|
| 5,404,510 A | 4/1995 | Smith et al. | |
| 5,412,804 A | 5/1995 | Krishna | |
| 5,418,950 A | 5/1995 | Li et al. | |
| 5,446,885 A | 8/1995 | Moore et al. | |
| 5,446,890 A | 8/1995 | Renslo et al. | |
| 5,459,859 A | 10/1995 | Senda | |
| 5,471,611 A | 11/1995 | McGregor | |
| 5,499,368 A | 3/1996 | Tate et al. | |
| 5,506,984 A | 4/1996 | Miller | |
| 5,513,305 A | 4/1996 | Maghbouleh | |
| 5,515,488 A | 5/1996 | Hoppe et al. | |
| 5,537,526 A | 7/1996 | Anderson et al. | |
| 5,560,005 A | 9/1996 | Hoover et al. | |
| 5,584,024 A | 12/1996 | Shwartz | |
| 5,596,744 A | 1/1997 | Dao et al. | |
| 5,608,904 A | 3/1997 | Chaudhuri et al. | |
| 5,630,121 A * | 5/1997 | Braden-Harder et al. | 1/1 |
| 5,701,453 A | 12/1997 | Maloney et al. | |
| 5,721,903 A | 2/1998 | Anand et al. | |
| 5,734,887 A | 3/1998 | Kingberg et al. | |
| 5,761,389 A | 6/1998 | Maeda et al. | |
| 5,761,429 A | 6/1998 | Thompson | |
| 5,761,654 A | 6/1998 | Tow | |
| 5,765,159 A | 6/1998 | Srinivasan | |
| RE35,861 E | 7/1998 | Queen | |
| 5,806,066 A | 9/1998 | Golshani et al. | |
| 5,809,497 A | 9/1998 | Freund et al. | |
| 5,893,087 A | 4/1999 | Wlaschin et al. | |
| 5,895,465 A | 4/1999 | Guha | |
| 5,918,232 A | 6/1999 | Pouschine et al. | |
| 5,924,074 A | 7/1999 | Evans | |
| 5,940,821 A | 8/1999 | Wical | |
| 5,943,666 A | 8/1999 | Kleewein et al. | |
| 5,953,718 A | 9/1999 | Wical | |
| 5,974,389 A | 10/1999 | Clark et al. | |
| 5,987,446 A | 11/1999 | Corey et al. | |
| 5,999,182 A | 12/1999 | Etchemendy et al. | |
| 5,999,933 A | 12/1999 | Mehta | |
| 5,999,944 A | 12/1999 | Lipkin | |
| 6,003,034 A | 12/1999 | Tuli | |
| 6,009,422 A * | 12/1999 | Ciccarelli | 1/1 |
| 6,012,067 A | 1/2000 | Sarkar | |
| 6,014,656 A | 1/2000 | Hallmark et al. | |
| 6,026,363 A | 2/2000 | Shepard | |
| 6,026,397 A | 2/2000 | Sheppard | |
| 6,026,409 A | 2/2000 | Blumenthal | |
| 6,038,560 A | 3/2000 | Wical | |
| 6,047,327 A | 4/2000 | Tso et al. | |
| 6,061,506 A | 5/2000 | Wollaston et al. | |
| 6,076,066 A | 6/2000 | DiRienzo et al. | |
| 6,088,707 A | 7/2000 | Bates et al. | |
| 6,092,204 A | 7/2000 | Baker | |
| 6,178,416 B1 | 1/2001 | Thompson et al. | |
| 6,189,004 B1 | 2/2001 | Rassen et al. | |
| 6,189,036 B1 | 2/2001 | Kao | |
| 6,222,540 B1 | 4/2001 | Sacerdoti | |
| 6,226,638 B1 | 5/2001 | Okura et al. | |
| 6,226,650 B1 | 5/2001 | Mahajan et al. | |
| 6,226,792 B1 | 5/2001 | Goiffon et al. | |
| 6,233,570 B1 | 5/2001 | Horvitz et al. | |
| 6,233,586 B1 * | 5/2001 | Chang et al. | 1/1 |
| 6,236,956 B1 | 5/2001 | Mantooth et al. | |
| 6,272,488 B1 | 8/2001 | Chang et al. | |
| 6,282,537 B1 | 8/2001 | Madnick et al. | |
| 6,289,334 B1 | 9/2001 | Reiner et al. | |
| 6,289,344 B1 | 9/2001 | Braia et al. | |
| 6,289,362 B1 | 9/2001 | Van Der Meer | |
| 6,341,277 B1 | 1/2002 | Coden et al. | |
| 6,343,291 B1 | 1/2002 | Goldman | |
| 6,347,329 B1 | 2/2002 | Evans | |
| 6,353,826 B1 | 3/2002 | Seputis | |
| 6,353,830 B1 | 3/2002 | Yee et al. | |
| 6,366,933 B1 | 4/2002 | Ball et al. | |
| 6,370,547 B1 | 4/2002 | Eftink | |
| 6,377,943 B1 | 4/2002 | Jakobsson | |
| 6,393,438 B1 | 5/2002 | Kathrow et al. | |
| 6,397,223 B1 | 5/2002 | Kori | |
| 6,408,291 B1 | 6/2002 | Skeen et al. | |
| 6,411,950 B1 | 6/2002 | Moricz et al. | |
| 6,421,675 B1 | 7/2002 | Ryan et al. | |
| 6,427,234 B1 | 7/2002 | Chambers et al. | |
| 6,442,543 B1 | 8/2002 | Snodgrass et al. | |
| 6,449,620 B1 | 9/2002 | Draper et al. | |
| 6,453,312 B1 | 9/2002 | Goiffon et al. | |
| 6,457,003 B1 | 9/2002 | Gajda et al. | |
| 6,457,009 B1 * | 9/2002 | Bollay | 707/770 |
| 6,460,034 B1 | 10/2002 | Wical | |
| 6,460,043 B1 * | 10/2002 | Tabbara et al. | 1/1 |
| 6,470,306 B1 | 10/2002 | Pringle et al. | |
| 6,484,156 B1 | 11/2002 | Gupta et al. | |
| 6,484,162 B1 | 11/2002 | Edlund et al. | |
| 6,484,164 B1 | 11/2002 | Nikolovska et al. | |
| 6,493,721 B1 | 12/2002 | Getchius et al. | |
| 6,496,843 B1 | 12/2002 | Getchius et al. | |
| 6,499,026 B1 | 12/2002 | Rivette et al. | |
| 6,507,833 B1 | 1/2003 | Hichwa et al. | |
| 6,513,041 B2 | 1/2003 | Tarin | |
| 6,519,592 B1 | 2/2003 | Getchius et al. | |
| 6,519,603 B1 | 2/2003 | Bays et al. | |
| 6,523,028 B1 | 2/2003 | DiDomizio et al. | |
| 6,546,388 B1 | 4/2003 | Edlund et al. | |
| 6,549,922 B1 | 4/2003 | Srivastava et al. | |
| 6,553,368 B2 | 4/2003 | Martin et al. | |
| 6,557,167 B1 | 4/2003 | Thelen | |
| 6,567,802 B1 | 5/2003 | Popa et al. | |
| 6,571,199 B1 | 5/2003 | Floratos et al. | |
| 6,571,295 B1 | 5/2003 | Sidana | |
| 6,581,038 B1 | 6/2003 | Mahran | |
| 6,581,054 B1 | 6/2003 | Bogrett | |
| 6,581,055 B1 | 6/2003 | Ziauddin et al. | |
| 6,594,669 B2 | 7/2003 | Asami et al. | |
| 6,596,030 B2 | 7/2003 | Ball et al. | |
| 6,601,065 B1 * | 7/2003 | Nelson et al. | 707/4 |
| 6,609,123 B1 | 8/2003 | Cazemier et al. | |
| 6,611,838 B1 | 8/2003 | Ignat et al. | |
| 6,640,221 B1 | 10/2003 | Levine et al. | |
| 6,643,633 B2 | 11/2003 | Chau et al. | |
| 6,647,382 B1 | 11/2003 | Saracco | |
| 6,651,055 B1 | 11/2003 | Kilmer et al. | |
| 6,658,410 B1 | 12/2003 | Sakamaki et al. | |
| 6,658,626 B1 | 12/2003 | Aiken | |
| 6,665,681 B1 | 12/2003 | Vogel | |
| 6,671,714 B1 | 12/2003 | Weyer et al. | |
| 6,678,674 B1 | 1/2004 | Saeki | |
| 6,687,878 B1 | 2/2004 | Eintracht et al. | |
| 6,711,563 B1 | 3/2004 | Koskas et al. | |
| 6,721,921 B1 | 4/2004 | Altman | |
| 6,725,225 B1 | 4/2004 | Kori | |
| 6,725,227 B1 | 4/2004 | Li | |
| 6,732,094 B1 | 5/2004 | Cousins et al. | |
| 6,795,825 B2 | 9/2004 | Rishe | |
| 6,799,184 B2 | 9/2004 | Bhatt et al. | |
| 6,803,927 B1 | 10/2004 | Sahoo | |
| 6,820,076 B2 * | 11/2004 | Bailey et al. | 707/3 |
| 6,826,559 B1 | 11/2004 | Ponte | |
| 6,871,318 B1 | 3/2005 | Wynblatt et al. | |
| 6,889,229 B1 | 5/2005 | Wong et al. | |
| 6,901,428 B1 | 5/2005 | Frazier et al. | |
| 6,910,188 B2 | 6/2005 | Keohane et al. | |
| 6,928,431 B2 | 8/2005 | Dettinger et al. | |
| 6,947,928 B2 | 9/2005 | Dettinger et al. | |
| 6,954,748 B2 | 10/2005 | Dettinger et al. | |
| 6,956,593 B1 | 10/2005 | Gupta et al. | |
| 6,978,324 B1 | 12/2005 | Black | |
| 6,985,899 B2 | 1/2006 | Chan et al. | |
| 6,985,912 B2 | 1/2006 | Mullins et al. | |
| 6,996,558 B2 * | 2/2006 | Dettinger et al. | 707/4 |
| 6,999,959 B1 | 2/2006 | Lawrence et al. | |
| 7,003,730 B2 | 2/2006 | Dettinger et al. | |
| 7,010,144 B1 | 3/2006 | Davis et al. | |
| 7,054,877 B2 | 5/2006 | Dettinger et al. | |
| 7,085,757 B2 | 8/2006 | Dettinger et al. | |
| 7,089,542 B2 | 8/2006 | Brand et al. | |
| 7,092,936 B1 | 8/2006 | Alonso et al. | |
| 7,096,229 B2 | 8/2006 | Dettinger et al. | |
| 7,139,766 B2 | 11/2006 | Thomson et al. | |
| 7,146,376 B2 | 12/2006 | Dettinger et al. | |

| | | |
|---|---|---|
| 7,149,730 B2 | 12/2006 | Mullins et al. |
| 7,152,072 B2 | 12/2006 | Dobrowski et al. |
| 7,162,691 B1 | 1/2007 | Chatterjee et al. |
| 7,185,317 B2 | 2/2007 | Fish et al. |
| 7,194,483 B1 | 3/2007 | Mohan et al. |
| 7,216,133 B2 | 5/2007 | Wu et al. |
| 7,249,118 B2 | 7/2007 | Sandler et al. |
| 7,260,777 B2 | 8/2007 | Fitzsimons et al. |
| 7,263,517 B2 | 8/2007 | Sheu et al. |
| 7,305,656 B2 | 12/2007 | Fish et al. |
| 7,310,639 B2 | 12/2007 | Dettinger et al. |
| 7,321,895 B2 | 1/2008 | Dettinger et al. |
| 7,333,981 B2 | 2/2008 | Dettinger et al. |
| 7,340,475 B2 | 3/2008 | Chowdhary et al. |
| 7,343,365 B2 | 3/2008 | Farnham et al. |
| 7,363,287 B2 | 4/2008 | Kilmer et al. |
| 7,373,481 B2 | 5/2008 | Xu |
| 7,383,255 B2 | 6/2008 | Desai et al. |
| 7,392,267 B2 | 6/2008 | Cragun et al. |
| 7,398,263 B2 | 7/2008 | Dettinger et al. |
| 7,440,945 B2 | 10/2008 | Dettinger et al. |
| 7,444,332 B2 | 10/2008 | Dettinger et al. |
| 7,448,022 B1 | 11/2008 | Ram et al. |
| 7,461,052 B2 | 12/2008 | Dettinger et al. |
| 7,480,648 B2 | 1/2009 | Adams et al. |
| 7,519,577 B2 | 4/2009 | Brundage et al. |
| 7,526,471 B2 | 4/2009 | Dettinger et al. |
| 7,539,662 B2 | 5/2009 | Dettinger et al. |
| 7,555,497 B2 | 6/2009 | Thompson et al. |
| 7,559,054 B2 | 7/2009 | Chang et al. |
| 7,593,929 B2 | 9/2009 | Dettinger et al. |
| 7,617,196 B2 | 11/2009 | Dettinger et al. |
| 7,624,097 B2 | 11/2009 | Dettinger et al. |
| 7,668,798 B2 | 2/2010 | Scanlon et al. |
| 7,668,806 B2 | 2/2010 | Liu et al. |
| 7,689,578 B2 | 3/2010 | Albornoz et al. |
| 7,698,441 B2 | 4/2010 | Dettinger et al. |
| 7,712,030 B1 | 5/2010 | Blau et al. |
| 7,743,019 B2 | 6/2010 | Shah et al. |
| 7,747,625 B2 | 6/2010 | Gargi et al. |
| 7,752,197 B2 | 7/2010 | Dettinger et al. |
| 7,782,866 B1 | 8/2010 | Walsh et al. |
| 7,797,690 B2 | 9/2010 | Nesbitt et al. |
| 7,805,435 B2 | 9/2010 | Dettinger et al. |
| 7,818,347 B2 | 10/2010 | Dettinger et al. |
| 7,818,348 B2 | 10/2010 | Dettinger et al. |
| 7,844,607 B2 | 11/2010 | Dettinger et al. |
| 7,849,074 B2 | 12/2010 | Dettinger et al. |
| 7,870,152 B2 | 1/2011 | Cragun et al. |
| 7,899,843 B2 | 3/2011 | Dettinger et al. |
| 7,904,469 B2 | 3/2011 | Dettinger et al. |
| 7,917,501 B2 | 3/2011 | Arends et al. |
| 2001/0016843 A1 | 8/2001 | Olson et al. |
| 2001/0016872 A1 | 8/2001 | Kusuda |
| 2001/0042098 A1 | 11/2001 | Gupta et al. |
| 2002/0013790 A1 | 1/2002 | Vandersluis |
| 2002/0016821 A1 | 2/2002 | Son et al. |
| 2002/0026592 A1 | 2/2002 | Gavrila et al. |
| 2002/0026630 A1 | 2/2002 | Schmidt et al. |
| 2002/0035563 A1 | 3/2002 | Suda et al. |
| 2002/0055932 A1 | 5/2002 | Wheeler et al. |
| 2002/0078008 A1 | 6/2002 | Cambot et al. |
| 2002/0078045 A1 | 6/2002 | Dutta |
| 2002/0078068 A1 | 6/2002 | Krishnaprasad et al. |
| 2002/0083039 A1 | 6/2002 | Ferrari et al. |
| 2002/0083094 A1 | 6/2002 | Golovchinsky et al. |
| 2002/0087640 A1 | 7/2002 | Quine et al. |
| 2002/0091702 A1 | 7/2002 | Mullins |
| 2002/0091990 A1 | 7/2002 | Little et al. |
| 2002/0116357 A1 | 8/2002 | Paulley |
| 2002/0123984 A1 | 9/2002 | Prakash |
| 2002/0124018 A1 | 9/2002 | Fifield et al. |
| 2002/0143860 A1 | 10/2002 | Catan |
| 2002/0147796 A1 | 10/2002 | Chung |
| 2002/0154120 A1 | 10/2002 | Cullimore et al. |
| 2002/0161602 A1 | 10/2002 | Dougherty et al. |
| 2002/0161801 A1 | 10/2002 | Hind et al. |
| 2002/0171670 A1 | 11/2002 | Clernock et al. |
| 2002/0174201 A1 | 11/2002 | Ramer et al. |
| 2003/0014399 A1 | 1/2003 | Hansen et al. |
| 2003/0028540 A1 | 2/2003 | Lindberg et al. |
| 2003/0046390 A1 | 3/2003 | Ball et al. |
| 2003/0061028 A1 | 3/2003 | Dey et al. |
| 2003/0061209 A1 | 3/2003 | Raboczi et al. |
| 2003/0061215 A1 | 3/2003 | Messina |
| 2003/0069881 A1 | 4/2003 | Huttunen |
| 2003/0074375 A1 | 4/2003 | Nakamura et al. |
| 2003/0081000 A1 | 5/2003 | Watanabe et al. |
| 2003/0120527 A1 | 6/2003 | Palomo et al. |
| 2003/0120665 A1 | 6/2003 | Fox et al. |
| 2003/0126136 A1 | 7/2003 | Omoigui |
| 2003/0126152 A1 | 7/2003 | Rajak |
| 2003/0144994 A1 | 7/2003 | Wen et al. |
| 2003/0145281 A1 | 7/2003 | Thames et al. |
| 2003/0154191 A1 | 8/2003 | Fish et al. |
| 2003/0163455 A1 | 8/2003 | Dettinger et al. |
| 2003/0167274 A1 | 9/2003 | Dettinger et al. |
| 2003/0169284 A1 | 9/2003 | Dettinger et al. |
| 2003/0172056 A1 | 9/2003 | Dettinger et al. |
| 2003/0177175 A1 | 9/2003 | Worley et al. |
| 2003/0182056 A1 | 9/2003 | Nozaki et al. |
| 2003/0196164 A1 | 10/2003 | Gupta et al. |
| 2003/0204490 A1 | 10/2003 | Kasriel |
| 2003/0204570 A1 | 10/2003 | Rehof et al. |
| 2003/0204759 A1 | 10/2003 | Singh |
| 2003/0208458 A1 | 11/2003 | Dettinger et al. |
| 2003/0208486 A1 | 11/2003 | Dettinger et al. |
| 2003/0212666 A1 | 11/2003 | Basu et al. |
| 2003/0214525 A1 | 11/2003 | Esfahany |
| 2003/0217033 A1 | 11/2003 | Sandler et al. |
| 2003/0220893 A1 | 11/2003 | Dettinger |
| 2004/0030687 A1 | 2/2004 | Hidaka et al. |
| 2004/0039736 A1 | 2/2004 | Kilmer et al. |
| 2004/0039820 A1 | 2/2004 | Colby et al. |
| 2004/0044879 A1 | 3/2004 | Xu |
| 2004/0064447 A1 | 4/2004 | Simske et al. |
| 2004/0068489 A1 | 4/2004 | Dettinger et al. |
| 2004/0073539 A1 | 4/2004 | Dettinger et al. |
| 2004/0075686 A1 | 4/2004 | Watler et al. |
| 2004/0088292 A1 | 5/2004 | Dettinger et al. |
| 2004/0128292 A1 | 7/2004 | Kinnell |
| 2004/0138946 A1 | 7/2004 | Stolze |
| 2004/0148278 A1 | 7/2004 | Milo et al. |
| 2004/0150669 A1 | 8/2004 | Sabiers et al. |
| 2004/0158567 A1 | 8/2004 | Dettinger et al. |
| 2004/0163042 A1 | 8/2004 | Altman |
| 2004/0172305 A1 | 9/2004 | Soerensen et al. |
| 2004/0192343 A1 | 9/2004 | Toyama |
| 2004/0199524 A1 | 10/2004 | Rys et al. |
| 2004/0205076 A1 | 10/2004 | Huang et al. |
| 2004/0205514 A1 | 10/2004 | Sommerer et al. |
| 2004/0205542 A1 | 10/2004 | Bargeron et al. |
| 2004/0205545 A1 | 10/2004 | Bargeron et al. |
| 2004/0205577 A1 | 10/2004 | Abe et al. |
| 2004/0210833 A1 | 10/2004 | Lerner et al. |
| 2004/0243545 A1 | 12/2004 | Boone et al. |
| 2004/0254939 A1 | 12/2004 | Dettinger et al. |
| 2004/0260675 A1 | 12/2004 | Bruno et al. |
| 2004/0260685 A1 | 12/2004 | Pfleiger et al. |
| 2004/0260691 A1 | 12/2004 | Desai et al. |
| 2004/0260702 A1 | 12/2004 | Cragun et al. |
| 2004/0260706 A1 | 12/2004 | Anonsen et al. |
| 2004/0260714 A1 | 12/2004 | Chatterjee et al. |
| 2004/0267760 A1 | 12/2004 | Brundage et al. |
| 2004/0267798 A1 | 12/2004 | Chatterjee et al. |
| 2005/0004911 A1 | 1/2005 | Goldberg et al. |
| 2005/0044098 A1 | 2/2005 | Dettinger et al. |
| 2005/0060162 A1 | 3/2005 | Mohit et al. |
| 2005/0071222 A1 | 3/2005 | Bigus et al. |
| 2005/0071827 A1 | 3/2005 | Lai |
| 2005/0076015 A1 | 4/2005 | Dettinger et al. |
| 2005/0144166 A1 | 6/2005 | Chapus et al. |
| 2005/0193114 A1 | 9/2005 | Colby et al. |
| 2005/0203876 A1 | 9/2005 | Cragun et al. |
| 2005/0203878 A1 | 9/2005 | Brill et al. |
| 2005/0289100 A1 | 12/2005 | Dettinger et al. |
| 2005/0289115 A1 | 12/2005 | Garden et al. |
| 2006/0001027 A1 | 1/2006 | Jang |

| | | | |
|---|---|---|---|
| 2006/0010127 A1 | 1/2006 | Dettinger et al. | |
| 2006/0047638 A1 | 3/2006 | Dettinger et al. | |
| 2006/0047648 A1 | 3/2006 | Martin | |
| 2006/0053142 A1 | 3/2006 | Sebbane | |
| 2006/0080598 A1 | 4/2006 | Bargeron et al. | |
| 2006/0095407 A1 | 5/2006 | Ortega et al. | |
| 2006/0095457 A1 | 5/2006 | Glasspool et al. | |
| 2006/0116999 A1 | 6/2006 | Dettinger et al. | |
| 2006/0136382 A1 | 6/2006 | Dettinger et al. | |
| 2006/0136469 A1 | 6/2006 | Dettinger et al. | |
| 2006/0143559 A1 | 6/2006 | Spielberg et al. | |
| 2006/0212418 A1 | 9/2006 | Dettinger et al. | |
| 2006/0224959 A1 | 10/2006 | McGuire et al. | |
| 2006/0282469 A1 | 12/2006 | Pan | |
| 2007/0005566 A1 | 1/2007 | Bobick et al. | |
| 2007/0016544 A1 | 1/2007 | Graefe et al. | |
| 2007/0027845 A1 | 2/2007 | Dettinger et al. | |
| 2007/0050149 A1 | 3/2007 | Raskin | |
| 2007/0067371 A1 | 3/2007 | Allan et al. | |
| 2007/0112745 A1 | 5/2007 | Dettinger et al. | |
| 2007/0112827 A1 | 5/2007 | Dettinger et al. | |
| 2007/0143285 A1 | 6/2007 | Drumm et al. | |
| 2007/0162465 A1 | 7/2007 | Cope | |
| 2007/0271249 A1 | 11/2007 | Cragun et al. | |
| 2008/0040308 A1 | 2/2008 | Ranganathan et al. | |
| 2008/0071760 A1 | 3/2008 | Dettinger et al. | |
| 2008/0072135 A1 | 3/2008 | Cragun et al. | |
| 2008/0077598 A1 | 3/2008 | Wilmering et al. | |
| 2008/0091668 A1 | 4/2008 | Dettinger et al. | |
| 2008/0091690 A1 | 4/2008 | Ellersick et al. | |
| 2008/0126328 A1 | 5/2008 | Dettinger et al. | |
| 2008/0126329 A1 | 5/2008 | Dettinger et al. | |
| 2008/0139968 A1 | 6/2008 | Endo et al. | |
| 2008/0154845 A1 | 6/2008 | Adams et al. | |
| 2008/0168109 A1 | 7/2008 | Gaurav et al. | |
| 2008/0209310 A1 | 8/2008 | Cragun et al. | |
| 2008/0215611 A1 | 9/2008 | Dettinger et al. | |
| 2008/0215612 A1 | 9/2008 | Dettinger et al. | |
| 2008/0250003 A1 | 10/2008 | Dettinger et al. | |
| 2008/0250004 A1 | 10/2008 | Dettinger et al. | |
| 2008/0250005 A1 | 10/2008 | Dettinger et al. | |
| 2008/0250006 A1 | 10/2008 | Dettinger et al. | |
| 2008/0256047 A1 | 10/2008 | Dettinger et al. | |
| 2008/0288235 A1 | 11/2008 | Dettinger et al. | |
| 2008/0301108 A1 | 12/2008 | Dettinger et al. | |
| 2008/0319968 A1 | 12/2008 | Dettinger et al. | |
| 2008/0319969 A1 | 12/2008 | Dettinger et al. | |
| 2009/0006352 A1 | 1/2009 | Dettinger et al. | |
| 2009/0055438 A1 | 2/2009 | Dettinger et al. | |
| 2009/0063477 A1 | 3/2009 | Adams et al. | |
| 2009/0138452 A1 | 5/2009 | Dettinger et al. | |
| 2009/0138456 A1 | 5/2009 | Dettinger et al. | |
| 2009/0182708 A1 | 7/2009 | Dettinger et al. | |
| 2010/0010980 A1 | 1/2010 | Dettinger et al. | |
| 2010/0057811 A1 | 3/2010 | Dettinger et al. | |
| 2010/0076961 A1 | 3/2010 | Dettinger et al. | |

FOREIGN PATENT DOCUMENTS

WO    WO-02/080026    10/2002

OTHER PUBLICATIONS

Meng, Weiyi, et al., "A Theory of Translation From Relational Queries to Hierarchical Queries" Apr. 1995, IEEE, p. 228-245.*
Calmet, Jacques, et al., "A generic query-translation framework for a mediator architecture" 1997, University of Karlsruhe, p. 434-443.*
Office Action History for U.S. Appl. No. 10/083,075 from Nov. 26, 2004 to Sep. 1, 2005.
The American Heritage College Dictionary, 2004, Houghton & Mifflin, Fourth Edition, p. 977.
IBM, "IBM Data Discovery and Query Builder Data Abstraction Model Reference Guide," 2004, IBM, USA, 114 pages.
Batory et al., "Implementing a Domain Model for Data Structurest 1,2," International Journal of Software Engineering and Knowledge Engineering, Sep. 1992, vol. 2(3): pp. 375-402.
Franconi et al., "A Data Warehouse Conceptual Data Model for Multidimensional Aggregation," Proceedings of the International Workshop on Design and Management of Data Warehouses (DMDW '99), 1999: pp. 13-1-13-10.
Shinichi Morishita, Avoiding Cartesian Products for Multiple Joins, Journal of the ACM, vol. 44, No. 1, Jan. 1997, pp. 57-85, Association for Computing Machinery, USA.
Terry Purcell, Star Join Optimization in DB2, Search400.com, pp. 1-9, http://search400.techtarget.com/tip/0,289483,sid3_gci1072305,00.html, accessed Jun. 18, 2008.
Susan D. Urban et al., Delta Abstractions: A Technique for Managing Database States in Runtime Debugging of Active Database Rules, IEEE Transactions on Knowledge and Data Engineering, vol. 15, No. 3, pp. 597-612, May/Jun. 2003, IEEE Computer Society, USA.
Tzy-Hey Chang and Edward Sciore, A universal Relation Data Model with Semantic Abstractions, IEEE Transactions on Knowledge and Data Engineering, vol. 4, No. 1, pp. 23-33, Feb. 1992, IEEE Computer Society, USA.
Lerm et al., "Cooperative Access to Relational and Object-Oriented Federated Databases", Proceedings of the Fourth Workshop on Future Trends of Distributed Computing Systems, Sep. 22-24, 1993, pp. 222-227, IEEE.
Bargeron et al., Annotations for Streaming Video on the Web: System Design and Usage Studies, Journal of Computer Networks: The International Journal of Computer and Telecommunications Networking, vol. 31, Issue 11, May 17, 1999, 11 pages, Elsevier North-Holland, Inc. New York, NY, USA.
R. Ramakrishnan, Database Management Systems, The McGraw-Hill Companies, Inc., 1998, pp. 28-29.
Prague et al., Access 97 Bible, IDG Books, 1997, pp. 254, 320, 408, 409 and 410.
Naser et al., "Improvise—a Process Modeling Interface with Multimedia Graph Diagrams", Electronic proceedings of the ACM Workshop on Effective Abstraction in Multimedia: Layout, Presentation, and Interaction in association with ACM Multimedia '95, Nov. 4, 1995, <<http://www.cs.uic.edu/~ifc/mmwsproc/northinorth.html>>.
Electrical Schematics Page, Apr. 25, 2002, http://www.jlab_org/accel/inj_grou/elec1.htm.
Wen et al., Query Clustering in the Web Context, Information Retrieval and Clustering, Kluwer Academic Publishers, pp. 1-30, 2002.
Wen et al., Query Clustering Using User Logs, ACM Transactions on Information Systems, vol. 20, No. 1, Jan. 2002, pp. 59-81.
Raghavan et al., On the Reuse of Past Optimal Queries, SIGIR'95, Seattle, WA, 1995, pp. 344-350, Association for Computing Machinery, Inc.
Wen et al., Clustering User Queries of a Search Engine, WWW'10, May 1-5, 2001, Hong Kong, pp. 162-168, Association for Computing Machinery, Inc.
Braunmueller et al., Multiple Similarity Queries: A Basic DBMS Operation for Mining in Metric Databases, IEEE Transaction on Knowledge and Data Engineering, vol. 13, No. 1, Jan./Feb. 2001, pp. 79-95, IEEE.
Necib et al., "Ontology Based Query Processing in Database Management Systems," Proceedings on 6th International Conference on Ontologies, Databases, and Applications of Semantics for Large Scale Information Systems (ODBASE 2003), 16 pages, 2003.
Halevy et al., "Schema Mediation in Peer Data Management Systems", Proceedings of the 19th International Conference on Data Engineering (ICDE'03), Mar. 5-8, 2003, pp. 505-516.
Ng et al., "PeerDB: A P2P-based System for Distributed Data Sharing", Proceedings of the 19th International Conference on Data Engineering (ICDE'03), Mar. 5-8, 2003, pp. 633-644.
Maedche et al., "Managing multiple and distributed ontologies on the Semantic Web", The VLDB Journal—The International Journal on Very Large Data Bases, vol. 12, Issue 4, Nov. 2003, pp. 286-302.
Diane E. Oliver, "Change Management and Synchronization of Local and Shared Versions of Controlled Vocabulary", Aug. 2000, Stanford University Dissertation retrieved on Jun. 14, 2011 from <URL:http:www.smi.stanford.edu/pubs/SMI_Reports/SMI-2000-0849.pdf> 302 pages.
Roger Jennings, Special Edition Using Microsoft® Access 2000 (1999), published by Que Corporation. Pages xxvili,2, 25, 204-205, 320-330, 333-374, 814, 850, 856, 863-864, 876, 939, 1044.

* cited by examiner

APPLICATION PORTABILITY AND EXTENSIBILITY THROUGH DATABASE SCHEMA AND QUERY ABSTRACTION

CROSS-REFERENCE TO RELATED APPLICATIONS

This is a continuation application of U.S. patent application Ser. No. 10/083,075, filed Feb. 26, 2002, now U.S. Pat. No. 6,996,558 entitled "IMPROVED APPLICATION PORTABILITY AND EXTENSIBILITY THROUGH DATABASE SCHEMA AND QUERY ABSTRACTION", which is herein incorporated by reference.

BACKGROUND OF THE INVENTION

1. Field of the Invention

The present invention generally relates to data processing and more particularly to accessing data independent of the particular manner in which the data is physically represented.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBeans™ (EJBT™) specification that is a component of the Java™ 2 Enterprise Edition (J2EET™) suite of technologies. In the cases of EJBT™, entity beans serve to encapsulate a given set of data, exposing a set of Application Program Interfaces (APIs) that can be used to access this information. This is a highly specialized approach requiring the software to be written (in the form of new entity EJBs™) whenever a new set of data is to be accessed or when a new pattern of data access is desired. The EJBT™ model also requires a code update, application build and deployment cycle to react to reorganization of the underlying physical data model or to support alternative data representations. EJBT™ programming also requires specialized skills, since more advanced Java™ programming techniques are involved. Accordingly, the EJBT™ approach and other similar approaches are rather inflexible and costly to maintain for general-purpose query applications accessing an evolving physical data model.

Another shortcoming of the prior art, is the manner in which information can be presented to the user. A number of software solutions support the use of user-defined queries, in which the user is provided with a tool to construct a query that meets the user's specific data selection requirements. In an SQL-based system, the user is given a list of underlying database tables and columns to choose from when building a query. The user must decide which tables and columns to access based on the naming convention used by the database administrator. This approach does not provide an effective way to subset the set of information presented to the user. As a result, even nonessential content is revealed to the user.

Therefore, there is a need for an improved and more flexible method for accessing data which is not limited to the particular manner in which the underlying physical data is represented.

SUMMARY OF THE INVENTION

The present invention generally is directed to a method, system and article of manufacture for accessing data independent of the particular manner in which the data is physically represented.

One embodiment provides a method of providing access to data having a particular physical data representation. The method comprises providing, for a requesting entity, a query specification comprising a plurality of logical fields for defining an abstract query; and providing mapping rules which map the plurality of logical fields to physical entities of the data.

Another embodiment provides a method of accessing data having a particular physical data representation. The method comprises issuing an abstract query by a requesting entity according to a query specification of the requesting entity; wherein the query specification provides a definition for the abstract query according to logical fields; and transforming the abstract query into a query consistent with the particular physical data representation according to mapping rules which map the logical fields to physical entities of the data.

Yet another embodiment provides a computer-readable medium containing a program which, when executed by a processor, performs an operation of providing access to data having a particular physical data representation. The program comprises a query specification for a requesting entity, the query specification comprising a plurality of logical fields for defining an abstract query; and mapping rules which map the plurality of logical fields to physical entities of the data.

Still another embodiment provides a computer-readable medium containing a program which, when executed by a processor, performs an operation of accessing data having a particular physical data representation. The operation comprises issuing an abstract query by a requesting entity according to a query specification of the requesting entity; wherein the query specification provides a definition for the abstract query according to logical fields; and transforming the abstract query into a query consistent with the particular physical data representation according to mapping rules which map the logical fields to physical entities of the data.

Still another embodiment provides a computer comprising a memory containing at least (i) a requesting entity comprising a query specification providing a definition for an abstract query according to logical fields, (ii) a data repository abstraction component comprising mapping rules which map the logical fields to physical entities of data, and (iii) a runtime component for transforming the abstract query into a query consistent with the physical entities of data according to the mapping rules; and a processor adapted to execute contents of the memory.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to a system, method and article of manufacture for accessing data independent of the particular manner in which the data is physically represented. In one embodiment, a data repository abstraction layer provides a logical view of the underlying data repository that is independent of the particular manner of data representation. A query abstraction layer is also provided and is based on the data repository abstraction layer. A runtime component performs translation of an abstract query into a form that can be used against a particular physical data representation.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Figure 1:
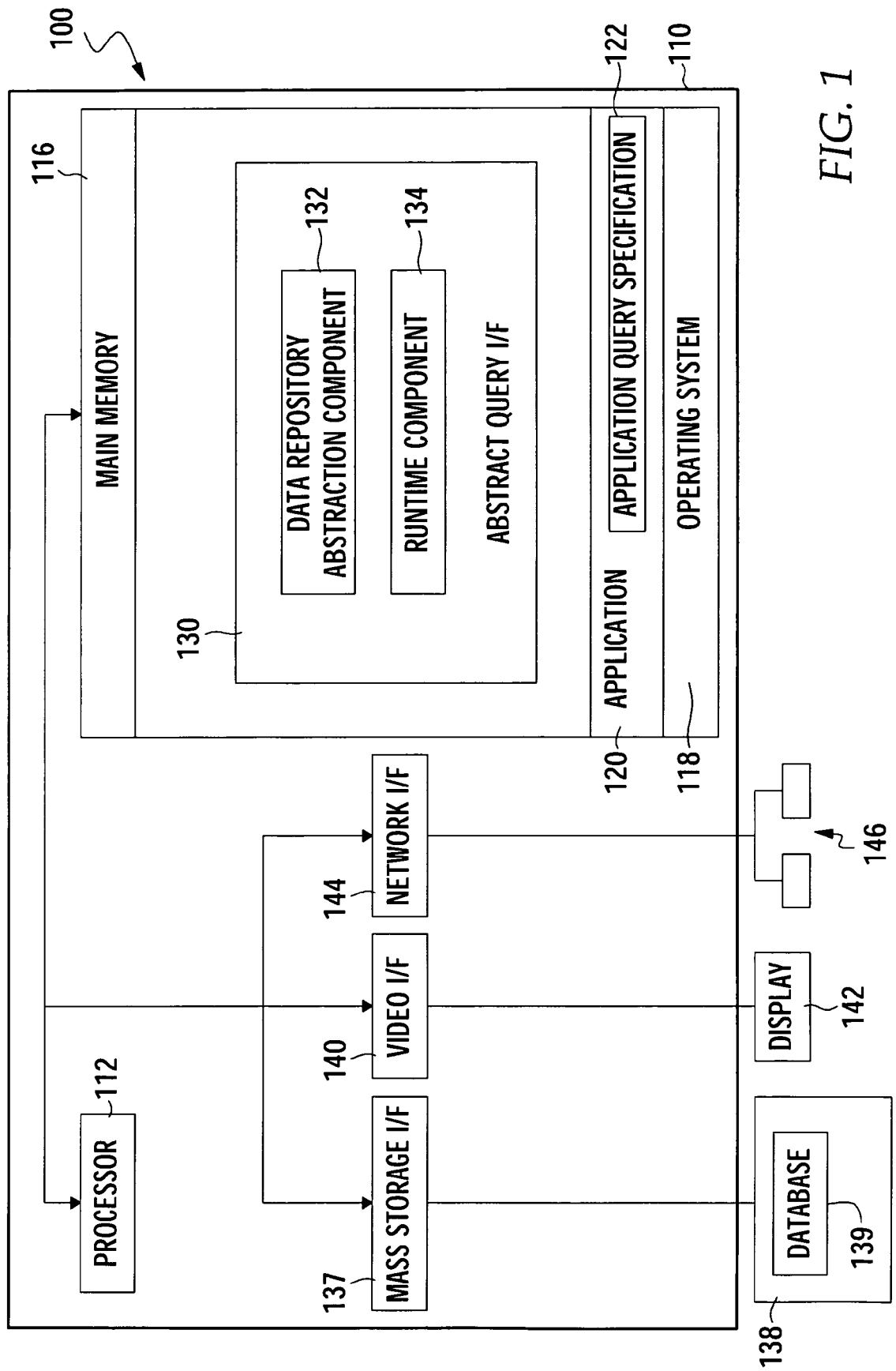
FIG. 1 is a computer system illustratively utilized in accordance with the invention.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer system 110 via bus 114.

The memory 116 is shown configured with an operating system 108. The operating system 118 is the software used for managing the operation of the computer system 100. Examples of the operating system 108 include IBM OS/400®, UNIX, Microsoft Windows®, and the like.

The memory 116 further includes one or more applications 120 and an abstract query interface 130. The applications 120 and the abstract query interface 130 are software products comprising a plurality of instructions that are resident at various times in various memory and storage devices in the computer system 100. When read and executed by one or more processors 112 in the computer system 100, the applications 120 and the abstract query interface 130 cause the computer system 100 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract query interface 130. In particular, the logical fields used in the abstract queries are defined by a data repository abstraction component 132 of the abstract query interface 130. The abstract queries are executed by a runtime component 134 which transforms the abstract queries into a form consistent with the physical representation of the data contained in the database 139. The application query specification 122 and the abstract query interface 130 are further described with reference to FIG. 2.

Figure 2A:
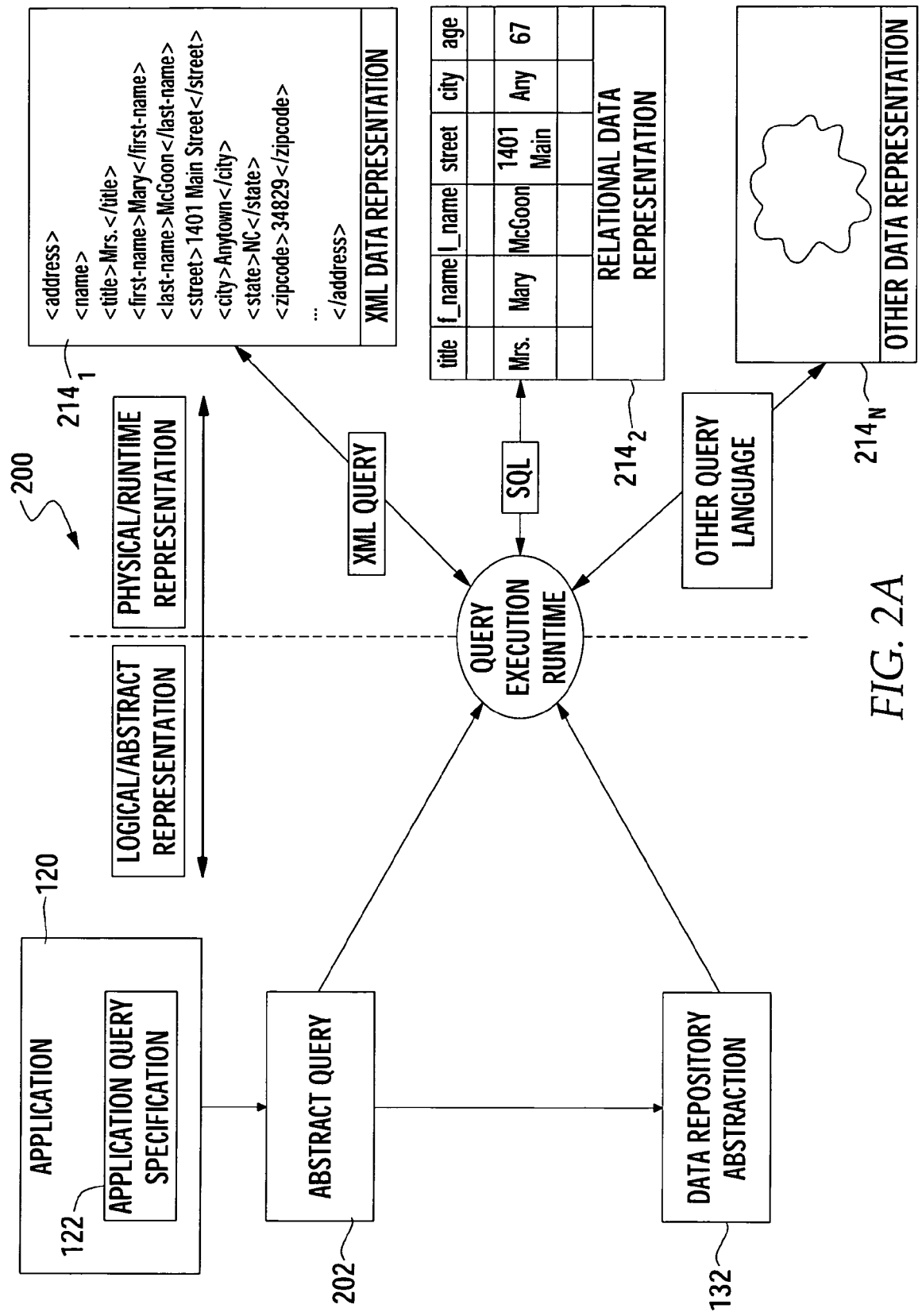
FIGS. 2A and 2B (collectively, FIG. 2) show a relational view of software components of one embodiment of the invention.
Figure 2B:
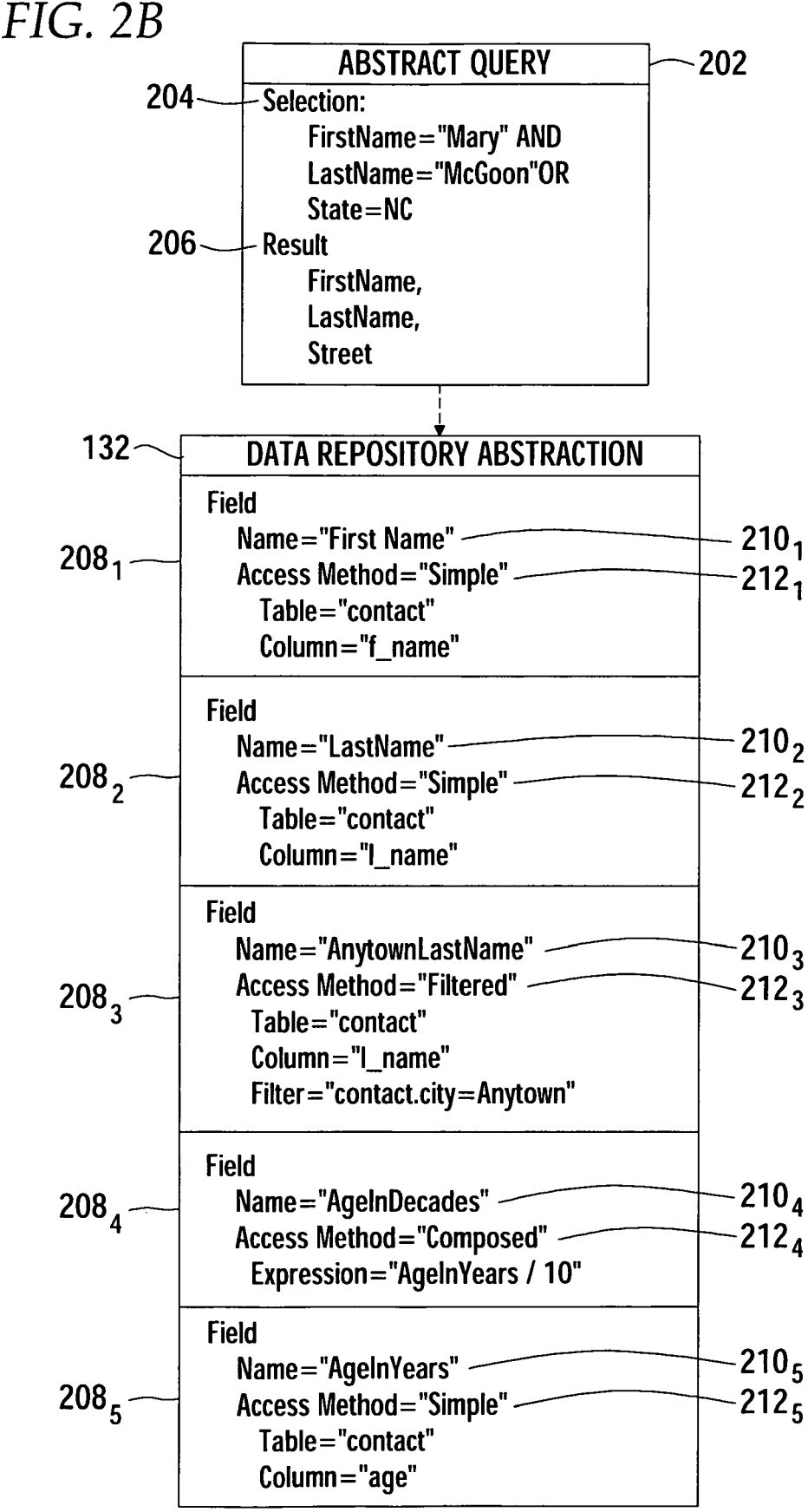

FIGS. 2A-B show an illustrative relational view 200 of components of the invention. The requesting entity (e.g., one of the applications 120) issues a query 202 as defined by the respective application query specification 122 of the requesting entity. The resulting query 202 is generally referred to herein as an "abstract query" because the query is composed according to abstract (i.e., logical) fields rather than by direct reference to the underlying physical data entities in the database 139. As a result, abstract queries may be defined that are independent of the particular underlying data representation used. In one embodiment, the application query specification 122 may include both criteria used for data selection (selection criteria 204) and an explicit specification of the fields to be returned (return data specification 206) based on the selection criteria 204.

The logical fields specified by the application query specification 122 and used to compose the abstract query 202 are defined by the data repository abstraction component 132. In general, the data repository abstraction component 132 exposes information as a set of logical fields that may be used within a query (e.g., the abstract query 202) issued by the application 120 to specify criteria for data selection and specify the form of result data returned from a query operation. The logical fields are defined independently of the underlying data representation being used in the database 139, thereby allowing queries to be formed that are loosely coupled to the underlying data representation.

In general, the data repository abstraction component 132 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ ... $214_N$ in a database (e.g., database 139). By way of illustration, two data representations are shown, an XML data representation $214_1$ and a relational data representation $214_2$. However, the physical data representation $214_N$ indicates that any other data representation, known or unknown, is contemplated. In one embodiment, a single data repository abstraction component 132 contains field specifications (with associated access methods) for two or more physical data representations 214. In an alternative embodiment, a different single data repository abstraction component 132 is provided for each separate physical data representation 214.

Any number of access methods are contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may computed. In the example illustrated in FIG. 2B the composed field access method $212_3$ maps the logical field name $210_3$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 132 shown in FIG. 2 are representative of logical fields mapped to data represented in the relational data representation $214_2$. However, other instances of the data repository extraction component 132 map logical fields to other physical data representations, such as XML.

An illustrative abstract query corresponding to the abstract query 202 shown in FIG. 2 is shown in Table I below. By way of illustration, the Data Repository Abstraction 132 is defined using XML. However, any other language may be used to advantage.

TABLE I

QUERY EXAMPLE

```
001    <?xml version="1.0"?>
002    <!--Query string representation: (FirstName = "Mary" AND LastName =
003    "McGoon") OR State = "NC"-->
004    <QueryAbstraction>
005        <Selection>
006            <Condition internalID="4">
007                <Condition field="FirstName" operator="EQ" value="Mary"
008    internalID="1"/>
009                <Condition field="LastName" operator="EQ" value="McGoon"
010    internalID="3" relOperator="AND"></Condition>
011            </Condition>
012            <Condition field="State" operator="EQ" value="NC"
                internalID="2"
013    relOperator="OR"></Condition>
014        </Selection>
015        <Results>
```

TABLE I-continued

QUERY EXAMPLE

```
016            <Field name="FirstName"/>
017            <Field name="LastName"/>
018            <Field name="State"/>
019        </Results>
020    </QueryAbstraction>
```

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative abstract query corresponding to the Data Repository Abstraction 132 shown in FIG. 2 is shown in Table II below. By way of illustration, the Data Repository Abstraction 132 is defined using XML. However, any other language may be used to advantage.

TABLE II

DATA REPOSITORY ABSTRACTION EXAMPLE

```
001    <?xml version="1.0"?>
002    <DataRepository>
003        <Category name="Demographic">
004            <Field queryable="Yes" name="FirstName"
                    displayable="Yes">
005                <AccessMethod>
006                    <Simple columnName="f_name"
                            tableName="contact"></Simple>
007                </AccessMethod>
008                <Type baseType="char"></Type>
009            </Field>
010            <Field queryable="Yes" name="LastName"
                    displayable="Yes">
011                <AccessMethod>
012                    <Simple columnName="l_name"
                            tableName="contact"></Simple>
013                </AccessMethod>
014                <Type baseType="char"></Type>
015            </Field>
016            <Field queryable="Yes" name="State"
                    displayable="Yes">
017                <AccessMethod>
018                    <Simple columnName="state"
                            tableName="contact"></Simple>
019                </AccessMethod>
020                <Type baseType="char"></Type>
021            </Field>
022        </Category>
023    </DataRepository>
```

Figure 3:
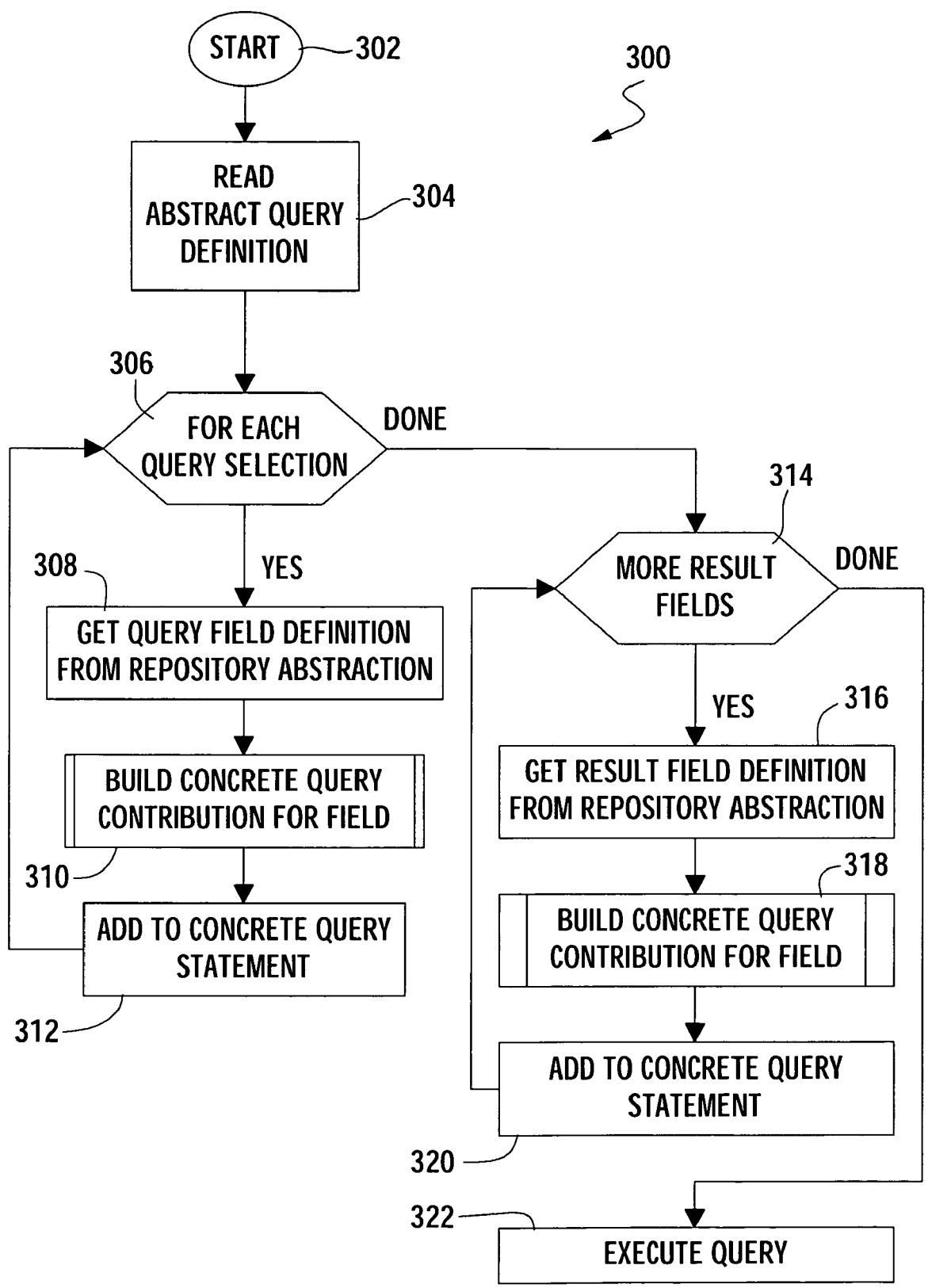
FIG. 3 is a flow chart illustrating the operation of a runtime component.

FIG. 3 shows an illustrative runtime method 300 exemplifying one embodiment of the operation of the runtime component 134. The method 300 is entered at step 302 when the runtime component 134 receives as input an instance of an abstract query (such as the abstract query 202 shown in FIG. 2). At step 304, the runtime component 134 reads and parses the instance of the abstract query and locates individual selection criteria and desired result fields. At step 306, the runtime component 134 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 134 uses the field name from a selection criterion of the abstract query to look up the definition of the field in the data repository abstraction 132. As noted above, the field definition includes a definition of the access method used to access the physical data associated with the field. The runtime component 134 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 134 looks up a result field name (from the result specification of the abstract query) in the data repository abstraction 132 and then retrieves a Result Field Definition from the data repository abstraction 132 to identify the physical location of data to be returned for the current logical result field. The runtime component 134 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

Figure 4:
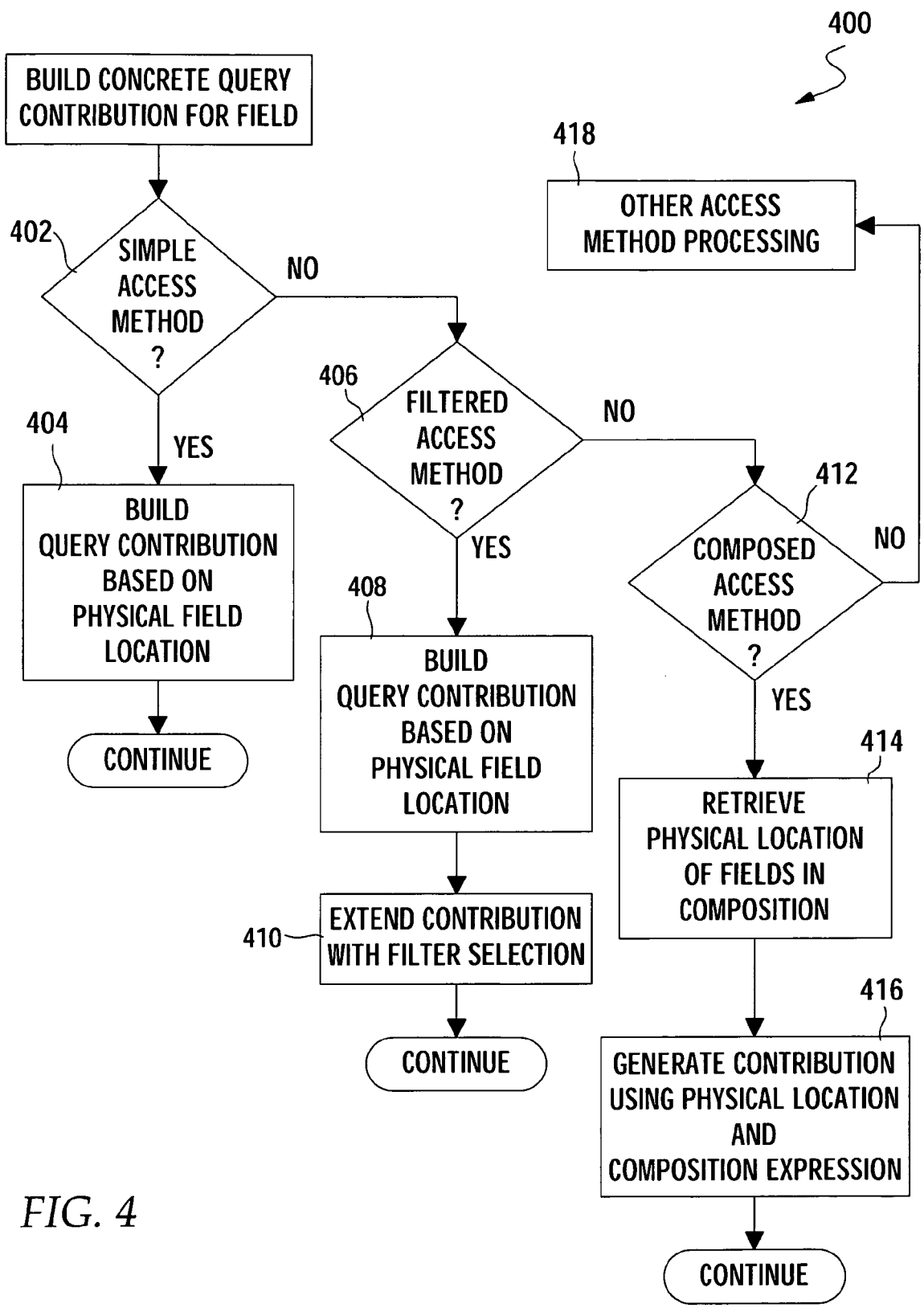
FIG. 4 is a flow chart illustrating the operation of a runtime component.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

In various embodiments, the invention provides numerous advantages over the prior art. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case with a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the invention facilitates ease-of-use for the application builder and the end-user. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operation are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

While the foregoing is directed to embodiments of the present invention, other and further embodiments of the invention may be devised without departing from the basic scope thereof, and the scope thereof is determined by the claims that follow.

What is claimed is:

1. A computer-implemented method of providing access to data having a particular schema, comprising:
    providing a data abstraction model which models the data having the particular schema and exposes the data to users in a manner that allows the users to compose abstract queries on the basis of the data abstraction model without knowledge of the particular schema; wherein the data abstraction model comprises a plurality of logical field definitions, the plurality of logical field definitions being maintained separately from physical queries, each of the logical field definitions comprising:
        (i) a logical field name;
        (ii) at least one location attribute identifying a location of physical data corresponding to the logical field name; and
        (iii) a reference to an access method for accessing the physical data in response to receiving the abstract query containing the logical field name, wherein at least one of the logical field names is different from a physical field name of the corresponding physical data as defined by the schema; and
    configuring one or more computer processors to perform an operation comprising:
        receiving an abstract query that is expressed according to a syntax of a predefined query language, comprising:
            (i) a user-specified result specification specifying one or more logical field definitions for which results are to be returned; and
            (ii) at least one user-specified selection criterion specifying conditions to filter the physical data corresponding to the one or more logical field definitions specified by the result specification; and
        accessing the data abstraction model in response to receiving the abstract query, wherein accessing comprises:
            invoking an access method of one of the one or more logical field definitions to access the physical data.

2. The method of claim 1, further comprising:
    receiving logical field selection input to a query composition application that defines an interface to the plurality of logical field definitions of the abstraction model, thereby allowing abstract queries to be composed on the basis of the plurality of logical field definitions.

3. The method of claim 1, further comprising:
    transforming the abstract query into a physical query consistent with the particular schema; the transforming being done on the basis of those logical field definitions of the data abstraction model that correspond to field names contained in the abstract query.

4. The method of claim 1, wherein each access method is selected from at least two different access method types; wherein each of the different access methods types defines a different manner of exposing the physical data corresponding to the logical field name of the respective logical field definition.

5. The method of claim 4, wherein the different access methods types include at least a composed access method type; wherein composed access methods, of respective logical field definitions, define an expression for the respective logical definitions, the expression being defined on the basis of a different logical field definition.

6. The method of claim 4, wherein the different access methods types include at least a simple access method type and a filtered access method type; wherein simple access methods map a corresponding logical field name directly to a particular physical data field of the physical data, and wherein filtered access methods map a corresponding logical field name to a subset of physical data corresponding to a particular physical data field of the physical data.

7. The method of claim 4, wherein the different access methods types include at least a simple access method type and a composed access method type; wherein simple access methods map a corresponding logical field name, of a respective logical field definition, directly to a particular physical data field of the physical data; and wherein composed access methods, of respective logical field definitions, define an expression for the respective logical definitions, the expression being defined on the basis of a different logical field definition.

8. The method of claim 1, further comprising:
    transforming the abstract query into a physical query consistent with the particular schema; the transforming including generating query logic not explicitly defined by user selections made in composing the abstract query on the basis of the abstraction model.

9. The method of claim 8, wherein the physical query consistent with the particular schema is one of a SQL query and an XML query.

10. A computer-implemented method of providing access to data having a particular schema, comprising:
    receiving abstract queries composed on the basis of a data abstraction model which models the data having the particular schema and exposes the data to users in a manner that allows the users to compose queries on the basis of the data abstraction model without knowledge of the particular schema; wherein the data abstraction model comprises a plurality of logical field definitions, the plurality of logical field definitions being maintained separately from physical queries, each of the logical field definitions comprising:
- (i) a logical field name;
- (ii) at least one location attribute identifying a location of physical data corresponding to the logical field name; and
- (iii) a reference to an access method invoked to access the physical data in response to receiving the abstract query containing the logical field name, wherein at least one of the logical field names is different from a physical field name of the corresponding physical data as defined by the schema;

and wherein each abstract query comprises:
- (i) a user-specified result specification specifying one or more logical field definitions for which results are to be returned; and
- (ii) at least one user-specified selection criterion specifying conditions to filter the physical data corresponding to the one or more logical field definitions specified by the result specification; and configuring one or more computer processors to perform an operation comprising, in response to receiving each abstract query, wherein each abstract query is expressed according to a syntax of a predefined query language:
- accessing those logical field definitions of the data abstraction model that correspond to logical field names included in the abstract query;
- on the basis accessed logical field definitions, transforming, by operation of the one or more computer processors, the abstract query into physical query consistent with the particular schema; and
- providing the physical query to a query execution environment for execution.

11. The method of claim 10, wherein the transforming includes generating query logic not explicitly defined by user selections made in composing the abstract query on the basis of the abstraction model.

12. The method of claim 10, wherein each access method is selected from at least two different access method types; wherein each of the different access methods types defines a different manner of exposing the physical data corresponding to the logical field name of the respective logical field definition.

13. The method of claim 10, wherein the different access methods types include at least a composed access method type; wherein composed access methods, of respective logical field definitions, define an expression for the respective logical definitions, the expression being defined on the basis of a different logical field definition.

14. The method of claim 12, wherein the different access methods types include at least a simple access method type and a filtered access method type; wherein simple access methods map a corresponding logical field name directly to a particular physical data field of the physical data, and wherein filtered access methods map a corresponding logical field name to a subset of physical data corresponding to a particular physical data field of the physical data.

15. The method of claim 12, wherein the different access methods types include at least a simple access method type and a composed access method type; wherein simple access methods map a corresponding logical field name, of a respective logical field definition, directly to a particular physical data field of the physical data; and wherein composed access methods, of respective logical field definitions, define an expression for the respective logical definitions, the expression being defined on the basis of a different logical field definition.

16. A computer-readable storage medium containing a program which, when executed by a computer processor, performs an operation of generating executable queries configured to access to data having a particular schema, the operation comprising:
- transforming abstract queries into physical queries, wherein the abstract queries are expressed according to a syntax of a predefined query language, wherein the abstract queries have been composed on the basis of a data abstraction model which models the data having the particular schema and exposes the data to users in a manner that allows the users to compose queries on the basis of the data abstraction model without knowledge of the particular schema, wherein the model comprises a plurality of logical field definitions, the plurality of logical field definitions being maintained separately from physical queries, each of the plurality of logical field definitions comprising:
  - (i) a logical field name;
  - (ii) at least one location attribute identifying a location of physical data corresponding to the logical field name; and
  - (iii) a reference to an access method invoked to access the physical data in response to receiving the abstract query containing the logical field name;
- wherein at least one of the logical field names is different from a physical field name of the corresponding physical data as defined by the schema;
- wherein each of the abstract queries comprises:
  - (i) a user-specified result specification specifying one or more logical field definitions for which results are to be returned; and
  - (ii) at least one user-specified selection criterion specifying conditions to filter the physical data corresponding to the one or more logical field definitions specified by the result specification; and
- wherein transforming comprises:
  - accessing those logical field definitions of the data abstraction model that correspond to logical field names included in the abstract query; and
  - generating query conditions on the basis of the accessed logical field definitions.

17. The computer-readable storage medium of claim 16, wherein the operation further comprises:
providing the physical queries to a query execution environment for execution.

18. The computer-readable storage medium of claim 16, wherein each access method is selected from at least two different access method types;
wherein each of the different access methods types defines a different manner of exposing the physical data corresponding to the logical field name of the respective logical field definition.

19. The computer-readable storage medium of claim 16, wherein at least some of the physical queries are SQL queries and at least some of the physical queries are non-SQL queries.

* * * * *